US 8,401,930 B1

(12) United States Patent  (10) Patent No.: US 8,401,930 B1
Cox et al.  (45) Date of Patent: Mar. 19, 2013

(54) COMPUTERIZED SYSTEM AND METHOD FOR LIBRARY COLLECTION ANALYSIS

(75) Inventors: Lisa Ailene Cox, Dublin, OH (US); Glenda Lammers, Columbus, OH (US); Myrtle Gay Myers, Canal Winchester, OH (US)

(73) Assignee: OCLC Online Computer Library Center, Inc., Dublin, OH (US)

( * ) Notice: Subject to any disclaimer, the term of this patent is extended or adjusted under 35 U.S.C. 154(b) by 871 days.

(21) Appl. No.: 11/766,443

(22) Filed: Jun. 21, 2007

(51) Int. Cl.
```
G06Q 10/00    (2012.01)
G06Q 1/14     (2006.01)
G06Q 20/00    (2012.01)
G06Q 30/00    (2012.01)
G07G 1/12     (2006.01)
G07G 5/00     (2006.01)
A01K 5/02     (2006.01)
G07B 17/00    (2006.01)
G07F 19/00    (2006.01)
```
(52) U.S. Cl. ............. 705/28; 705/22; 705/24; 705/26.2; 705/26.9; 705/29; 705/30
(58) Field of Classification Search ............... 705/22–30
See application file for complete search history.

(56) References Cited

U.S. PATENT DOCUMENTS

| 5,237,498 A * | 8/1993 | Tenma et al. ................... 705/30 |
| 2002/0052808 A1 * | 5/2002 | Sekihata et al. ............... 705/28 |
| 2004/0064832 A1 * | 4/2004 | Tsukidate et al. .............. 725/14 |
| 2006/0112085 A1 * | 5/2006 | Zijlstra et al. ..................... 707/3 |
| 2008/0216082 A1 * | 9/2008 | Eilam et al. ................... 718/104 |
| 2008/0319938 A1 * | 12/2008 | Rabinovich ....................... 707/1 |

OTHER PUBLICATIONS

OCLC WorldCat Resource Sharing (http://web.archive.org/web/20050514041804/http://www.oclc.org/resourcesharing/default.htm).*
OCLC WorldCat Resource Sharing FirstSearch closerlook (http://web.archive.org/web/20050308043914/www.oclc.org/firstsearch/about/tour/closerlook1.htm).*
OCLC WorldCat resource (http://web.archive.org/web/20050514041804/http://www.oclc.org/resourcesharing/default.htm.*
OCLC InterLibrary Loan (http://web.archive.org/web/20050423205922/www.oclc.org/ill/.*
Jennifer Knievel, Use of circulation statistics and interlibrary loan data in collection management (http://crl.acrl.org/content/67/1/35.full.pdf+html).*

* cited by examiner

*Primary Examiner* — Ig T An
(74) *Attorney, Agent, or Firm* — Standley Law Group LLP (57) ABSTRACT

An automated tool for analyzing inter-library loan (ILL) transactions to identify holding needs for a library. The automated tool may be used in conjunction with a bibliographic database that comprises data related to inter-library loan requests and document orders. Libraries have the ability to compare borrowing requests over time to identify acquisition priorities, compare borrowing requests based on age, subject, serial, and nonserial items, analyze items the library is borrowing, and analyze items the library is lending. ILL request data may be analyzed by date, by frequency, and by cost. The library may then decide to acquire additional holdings for its collection based on the analyses of ILL transaction data.

18 Claims, 10 Drawing Sheets

| | | Total Titles Held | ILL Requests – by Request Date | | | | |
|---|---|---|---|---|---|---|---|
| | | | Totals | 2006 | 2005 | 2004 | 2003 |
| | Divisions Totals by "Division" | 188048 | 7940 | 2101 | 2182 | 2328 | 1329 |
| | ▷ Agriculture | 4219 | 468 | 111 | 140 | 137 | 80 |
| | ▷ Anthropology | 1761 | 32 | 2 | 15 | 11 | 4 |
| | ▷ Art & Architecture | 8424 | 51 | 11 | 6 | 15 | 19 |
| | ▷ Biological Sciences | 6476 | 1247 | 216 | 418 | 416 | 197 |
| | ▷ Business & Economics | 12503 | 236 | 61 | 68 | 60 | 47 |
| | ▷ Chemistry | 910 | 86 | 22 | 25 | 30 | 9 |

FIG-1

| Home | Databases | Searching | Collection Analysis |
|------|-----------|-----------|---------------------|

| Data to Analyze | Analysis Results | Limit Analysis | Change Analysis | Go to page ▽ |
|---|---|---|---|---|

Data to Analyze: My Library as Lender
Column Values: Request Date
Row Expansion Order: Division>Borrowing Library>Language>Format>Audience
Limits: (No Limits Selected)

— 120

| Request Date | Request Frequency |
|---|---|

Display Results as: Number Only ▽

Data to Analyze: My Library as Lender ▽ — 122

| | Total Titles Held | Totals | ILL Requests – by Request Date ||||
|---|---|---|---|---|---|---|
| | | | 2006 △ | 2005 △ | 2004 △ | 2003 △ |
| Divisions Totals by "Division" | 188048 | 7968 | 1585 | 2198 | 2554 | 1629 |
| ▽ Agriculture | 4219 | 284 | 58 | 68 | 108 | 50 |
| ▽ Anthropology | 1761 | 161 | 38 | 36 | 45 | 42 |
| ▽ Art & Architecture | 8424 | 339 | 65 | 96 | 97 | 81 |
| ▽ Biological Sciences | 6476 | 789 | 157 | 189 | 269 | 174 |
| ▽ Business & Economics | 12503 | 350 | 78 | 100 | 112 | 60 |
| ▽ Chemistry | 910 | 35 | 5 | 10 | 14 | 6 |

| | Divisions Totals by "Division" | Total Titles Held | Totals | 2006 ▽ | ILL Requests – by Request Date ||||| 2005 △ | 2 |
| --- | --- | --- | --- | --- | --- | --- | --- | --- | --- | --- | --- |
| | | | | | Fourth Quarter | Third Quarter | Second Quarter | First Quarter | | | |
| ⊞ | △ Agriculture | 432417 | 14648 | 4118 | 1 | 600 | 1590 | 1927 | | 3982 | |
| ⊞ | △ Anthropology | 9592 | 845 | 223 | | 3 | 45 | 175 | | 230 | |
| ⊞ | △ Art & Architecture | 3762 | 66 | 8 | | 2 | 4 | 2 | | 31 | |
| ⊞ | △ Biological Sciences | 18928 | 162 | 42 | | 15 | 10 | 17 | | 26 | |
| ⊞ | △ Business & Economics | 14132 | 1952 | 354 | | 55 | 96 | 203 | | 657 | |
| ⊞ | △ Chemistry | 26892 | 470 | 122 | | 17 | 36 | 69 | | 156 | |
| ⊞ | △ Computer Science | 1304 | 118 | 36 | | 13 | 9 | 14 | | 33 | |
| ⊞ | | 1996 | 54 | 22 | | | 7 | 15 | | 8 | |

FIG-3

| | Total Titles Held | ILL Requests – by Request Frequency | | | |
|---|---|---|---|---|---|
| | | Totals | 1 Time | 2-5 Times | 6-10 Times | >10 Times |
| Divisions Totals by "Division" | 188048 | 3299 | 2145 | 887 | 161 | 106 |
| △ Agriculture | 4219 | 171 | 102 | 49 | 14 | 6 |
| △ Anthropology | 1761 | 22 | 18 | 3 | 1 | |
| △ Art & Architecture | 8424 | 48 | 35 | 5 | 6 | 2 |
| △ Biological Sciences | 6476 | 419 | 221 | 149 | 30 | 19 |
| △ Business & Economics | 12503 | 141 | 105 | 32 | 3 | 1 |
| △ Chemistry | 910 | 42 | 24 | 15 | 2 | 1 |

FIG-4

| | Total Titles Held | ILL Requests – by Request Cost | | | | | | |
|---|---|---|---|---|---|---|---|---|
| | | Totals | Free | <$10.00 | $10.01–$20.00 | $20.01–$30.00 | $30.01–$40.00 | $40.01–$50.00 | >$50.00 | Unknown |
| Divisions Totals by "Division" | 1568545 | 58111 | 14653 | 2121 | 5628 | 407 | 220 | 543 | 42 | 34497 |
| △ Agriculture | 18658 | 661 | 152 | 18 | 38 | 3 | 1 | 3 | | 446 |
| △ Anthropology | 11069 | 498 | 141 | 10 | 49 | 3 | | 7 | | 288 |
| △ Art & Architecture | 47493 | 1309 | 341 | 64 | 137 | 4 | | 1 | | 762 |
| △ Biological Sciences | 30705 | 1992 | 514 | 63 | 216 | 11 | 16 | 30 | 3 | 1139 |
| △ Business & Economics | 205839 | 2606 | 683 | 87 | 153 | 11 | 4 | 3 | 1 | 1664 |
| △ Chemistry | 7271 | 412 | 126 | 15 | 26 | | | 22 | | 223 |
| △ Comunicable Diseases & Miscellaneous | 76 | 2 | 1 | | 1 | | | | | |
| △ Computer Science | 14071 | 652 | 198 | 22 | 38 | 4 | 2 | 8 | | 380 |

FIG-5

WorldCat Collection Analysis results:
Records found: 14,872 Rank by: Number of Libraries Sort  E-mail  Print  Export  Help ▽  [ 1 ]  △
Prev      Next ☐ 1. Great books as life-teachers: studies of character, real and ideal,
Author: Hillis, Newell Dwight, 1858-1929.
Publication: Chicago, New York [etc.] Fleming H. Revell Co., 1899.
Document: English : Book
Libraries Worldwide: 328 | Regional Holdings | State Holdings | Group Names & Codes
Group Holdings [ Select ]  Heartland Memorial Library
Accession No: OCLC: 849823 National Library Cataloging: Library of Congress (DLC)
○ See more details for locating this item ☐ 2. Architectural record.
Publication: New York City : The Record and Guide, 1891–
Document: English : Serial Publication : Periodical : Monthly
Libraries Worldwide: 1815 | Regional Holdings | State Holdings | Group Names & Codes
Group Holdings [ Select ]  Heartland Memorial Library
Accession No: OCLC: 1481864
○ See more details for locating this item ☐ 3. Historical studies of church-building in the middle ages, Venice, Siena, Florence,
Author: Norton, Charles Eliot, 1827-1908
Publication: New York, Harper & Bros., 1880

Borrowing Library
Check All
Clear All
Top 10 ◉
Top 25 ○
Top 50 ○
All ○

☐ EASTERN WASHINGTON UNIV (WEA-128)
☐ PIERCE CNTY LIBR SYST (RLS-119)
☐ UNIV OF IDAHO LIBR (NTD-162)
☑ KING CNTY LIBR SYST (NYG-292)
☑ SEATTLE PUB LIBR (UOK-308)
☐ WESTERN WASHINGTON UNIV (XFF-166)
☐ LEWIS & CLARK COL (OLP-227)
☑ TIMBERLAND REG LIBR (UOJ-318)
☐ WILLIAMETTE UNIV (OWS-146)
☐ PACIFIC LUTHERAN UNIV (OPV-143)

190

Request Date
Check All
Clear All
Show Quarters ☐

☐ 2006
☑ 2005
☐ 2004
☐ 2003

192

Copy/Loan
Check All
Clear All

☐ Loan
☑ Copy

194

Language
☐ Arabic ☐ English ☐ Hungarian ☐ Norwegian ☐ Spanish
☑ Bulgarian ☐ French ☐ Indonesian ☐ Persian ☐ Swedish
☐ Chinese ☐ German ☐ Italian ☑ Polish ☐ Thai
☑ Croatian ☐ Greek, Modern [1453–] ☐ Japanese ☐ Portuguese ☐ Turkish
☑ Czech ☐ Hebrew ☐ Korean ☐ Romanian ☑ Ukrainian
☐ Danish ☐ Hindi ☐ Latin ☑ Russian ☐ Other
☐ Dutch Check All
Clear All

—196

Format
☐ Archival Materials ☐ Continually Updated Resources, Electronic ☐ Serial Publications, Electronic
☐ Archival Materials, Electronic ☐ Maps ☐ Sound Recordings
☐ Articles ☐ Maps, Electronic ☐ Sound Recordings, Electronic
☐ Articles, Electronic ☐ Musical Scores ☑ Texts, Electronic
☐ Books ☐ Musical Scores, Electronic ☐ Visual Materials
☐ Computer Files ☐ Serial Publications ☐ Visual Materials, Electronic
☐ Continually Updated Resources Check All
Clear All

| Lending Library | Request Cost | Holding Status | Publication Date | Division | Language | Format | Audience |
|---|---|---|---|---|---|---|---|
| • BRITISH LIBR<br>• CISTI | • Free<br>• <$10.00<br>• $10.01–$20.00 | • Held | • 1990–1994<br>• 1995–1999<br>• 2000 | • Art & Architecture<br>• Music<br>• Performing Arts | • English<br>• French<br>• German<br>• Spanish | • Musical Scores<br>• Sound Recordings | • Adult |

Selected Limts

Data to Analyze | Analysis Results | Limit Analysis | Change Analysis | Go to page ▷

Data to Analyze: My Library as Borrower
Column Values: Request Date
Row Expansion Order: Division>Holding Status>Lending Library>Request Cost>Language>Format>Audience
Limits: (No Limits Selected)

Data to Analyze: [My Library as Borrower ▷]

Column Values: ○Format ○Language ○Publication Date ⦿Request Date ○Holding Status ○Request Frequency ○Request Cost

200 — 202 — 204

Row Expansion Order:

| 1st Level | 2nd Level | 3rd Level | 4th Level | 5th Level | 6th Level | 7th Level |
|---|---|---|---|---|---|---|
| [None]<br>Audience<br>Division<br>Format<br>Holding Status<br>Language<br>Lending Library<br>Request Cost<br>Request Date<br>Copy/Loan | [None]<br>Audience<br>Division<br>Format<br>Holding Status<br>Language<br>Lending Library<br>Request Cost<br>Request Date<br>Copy/Loan | [None]<br>Audience<br>Division<br>Format<br>Holding Status<br>Language<br>Lending Library<br>Request Cost<br>Request Date<br>Copy/Loan | [None]<br>Audience<br>Division<br>Format<br>Holding Status<br>Language<br>Lending Library<br>Request Cost<br>Request Date<br>Copy/Loan | [None]<br>Audience<br>Division<br>Format<br>Holding Status<br>Language<br>Lending Library<br>Request Cost<br>Request Date<br>Copy/Loan | [None]<br>Audience<br>Division<br>Format<br>Holding Status<br>Language<br>Lending Library<br>Request Cost<br>Request Date<br>Copy/Loan | [None]<br>Audience<br>Division<br>Format<br>Holding Status<br>Language<br>Lending Library<br>Request Cost<br>Request Date<br>Copy/Loan |

Run Analysis | Use Defaults | Cancel

COMPUTERIZED SYSTEM AND METHOD FOR LIBRARY COLLECTION ANALYSIS

CROSS-REFERENCES TO RELATED APPLICATIONS

None.

FIELD OF THE INVENTION

The present invention relates generally to software tools for analyzing holdings information contained in a bibliographic database. In particular, the present invention is a web-based tool for analyzing inter-library loan transactions to identify collection and acquisition needs for a library.

BACKGROUND OF THE INVENTION

The largest and most comprehensive bibliographic database in the world is the WorldCat® database from OCLC. It comprises millions of online records built from the bibliographic and ownership information of contributing libraries. Cataloged items span thousands of years and nearly every form of human expression. Records exist for physical items, electronic content, born-digital works, and digitally preserved artifacts. WorldCat database records represent items from hundreds of languages and cultures in hundreds of countries and territories around the world. Item records are written in many languages and the database supports cataloging in many different scripts.

Because holdings contained in the WorldCat database are extensive, libraries need automated tools to review and analyze them. One such tool is the WorldCat collection analysis, a web-based service that provides automated analysis and comparison of library collections based on holdings information contained in the WorldCat bibliographic database. In particular, it allows a library to evaluate its holdings by identifying unique items, overlaps, and gaps in the collection and to compare its holdings by evaluating its collection against the collections of other libraries.

The features and functionality of WorldCat collection analysis provide libraries with a substantial amount of information about their holdings. The ability to compare collections between libraries can be helpful to the libraries in identifying "gaps" in their holdings. For a library that wants to expand its holdings, the differences between its holdings and the holdings of other libraries may help the library decide what materials to add to its collection. The library may decide to purchase for its collection materials that are frequently found in other libraries' collections and therefore, potentially of interest to its own patrons.

Although comparisons and information about differences between library holdings may provide some guidance in selecting new materials, there is a chance that the newly purchased materials are not of great interest to the patrons of a particular library. Before purchasing additional holdings, it would be helpful to a library to have information about the needs of its patrons and the materials that are most likely to be of interest to its patrons. One way to gauge the interest of patrons in a library's holdings is to analyze inter-library loan transactions. The ability to review and analyze materials that a library's patrons are requesting from other libraries can help a library identify materials that are likely to be of interest to its patrons. The volume of data related to inter-library loans, however, is substantial. Libraries process tens of millions of inter-library loan transactions each year. Therefore, there is a need for an automated tool to analyze inter-library loan transactions to identify holding needs for a library.

SUMMARY OF THE INVENTION

The present invention is an automated tool for analyzing inter-library loan (ILL) transactions using an existing collection analysis structure to identify holding needs for a library. In an example embodiment of the present invention, the automated tool is an extension to the WorldCat collection analysis service for use in conjunction with the WorldCat database. A WorldCat resource sharing data component available to WorldCat database contributing libraries enables libraries to create, send, manage, and track inter-library loan requests and document orders. A web-based interface allows contributing libraries to make requests and fulfill them. The requests and orders are recorded and therefore, available for further analysis according to the features and functionality of the present invention.

The inter-library loan (ILL) analysis tool gives a library the ability to:
1. compare borrowing requests over time to identify acquisition priorities;
2. compare borrowing requests based on age, subject, serial, and nonserial items;
3. analyze items the library is borrowing—items that supplement the collection; and
4. analyze items the library is lending—how the collection is used.

A user using the ILL analysis tool specifies initially whether to analyze the data for the library as a borrower or a lender. Further options available to the user are based on whether the analysis is directed to the library as a borrower or a lender. The user may review analyses of ILL request data such as requests by date, requests by frequency and requests by cost. Results are presented in tabular form. Results may be expanded by selecting various icons associated with table cells. The library may then decide to acquire additional holdings for its collection based on the analyses of ILL transaction data.

BRIEF DESCRIPTION OF THE DRAWINGS

FIG. 5 shows results for an example Request by Cost analysis screen;

FIGS. 7 and 8 are sample screens for limiting dimensions of an analysis;

DETAILED DESCRIPTION OF THE INVENTION

An example embodiment of the present invention is implemented as an extension to the WorldCat collection analysis service for use with the WorldCat bibliographic database and WorldCat resource sharing data. The WorldCat collection analysis service is a web-accessible collection analysis tool that supports multiple aspects of library collections management. It provides information about a library's collection(s) as represented by holdings in the WorldCat database. The present invention provides information about external use of the library's collection, as well as documents potential areas for acquisition, by tracking the collection's borrowing and lending activity within WorldCat resource sharing which records patron ILL requests and orders.

ILL requests and orders that are recorded in a database may comprise data such as the following: ILL transaction identifier; ILL request date; borrower institution, borrower; date item is needed; cancellation date if item cannot be located; item identifying information such as title, publication date, and format; charges and other borrower obligations; lending institutions receiving request; lending institution fulfilling request; date request fulfilled; date item received at borrowing institution; date borrower notified of availability of item; date item checked out of borrowing institution; date item returned to borrowing institution; and date item returned to lending institution.

In particular, borrowing and lending activity may be tracked by:

1. library role (Borrower/Lender);
2. request activity (Request Date, Request Frequency, Request Cost); and
3. external borrowing of items owned or not owned by the library (Holding Status)

Understanding the results of an ILL data analysis is facilitated by an understanding of the OCLC conspectus for structuring WorldCat holdings. The conspectus is structured in a hierarchical order, from broad divisions to very specific subjects. Each level is an increasingly detailed partition of the previous level. The three levels in the conspectus, in hierarchical order, are:

TABLE 1

| Name | Number | Description |
|---|---|---|
| Division | 32 | Divisions represent broad disciplines of knowledge. They are not tied to a specific classification scheme. Examples are: Agriculture Anthropology Art & Architecture Biological Sciences Business & Economics Chemistry Communicable Diseases & Miscellaneous Computer Science Education Engineering & Technology Geography & Earth Sciences Government Documents Health Facilities, Nursing & History Health Professions & Public Health History & Auxiliary Sciences Language, Linguistics & Literature Law Library Science, Generalities & Reference Mathematics Medicine Medicine by Body System Medicine by Discipline Music Performing Arts Philosophy & Religion Physical Education & Recreation Physical Sciences Political Sciences Psychology Sociology Unknown |
| Category | Approximately 500 | Categories represent topics within a specific division. These are correlated with Library of Congress, Dewey Decimal or National Library of Medicine classification numbers. Example: Music Instrumental Music |
| Subject | Approximately 7000 | Subjects provide the most detailed identification within a specific category. Example: Music Instrumental Music Piano Music |

A computer user with a web browser may access a web-based application that interfaces to a database comprising ILL data. To complete ILL analyses according to the present invention, the user responds to prompts for information and is presented with the results of the data analysis. First, a role for a library is specified. Library roles include borrower (My Library as Borrower) or lender (My Library as Lender). For borrowing, all requests for materials or documents from other libraries are counted as borrowing requests, even if the request expires as unfilled. For lending, all requested items that are physically or electronically shipped from the library are counted as lending requests, even if the item is not expected to be returned such as a photocopy of an article.

A request activity for the library is also specified. Request activities relate to a basis for analyzing the transaction data. Libraries can analyze their borrowing requests based on the date of the request (Request by Date), the number of times the same item has been requested (Request by Frequency), and the cost of borrowing the requested item (Request by Cost). Libraries can analyze their lending requests based on the date of the request (Request by Date) and the number of times the same item was loaned (Request by Frequency).

Figure 1:
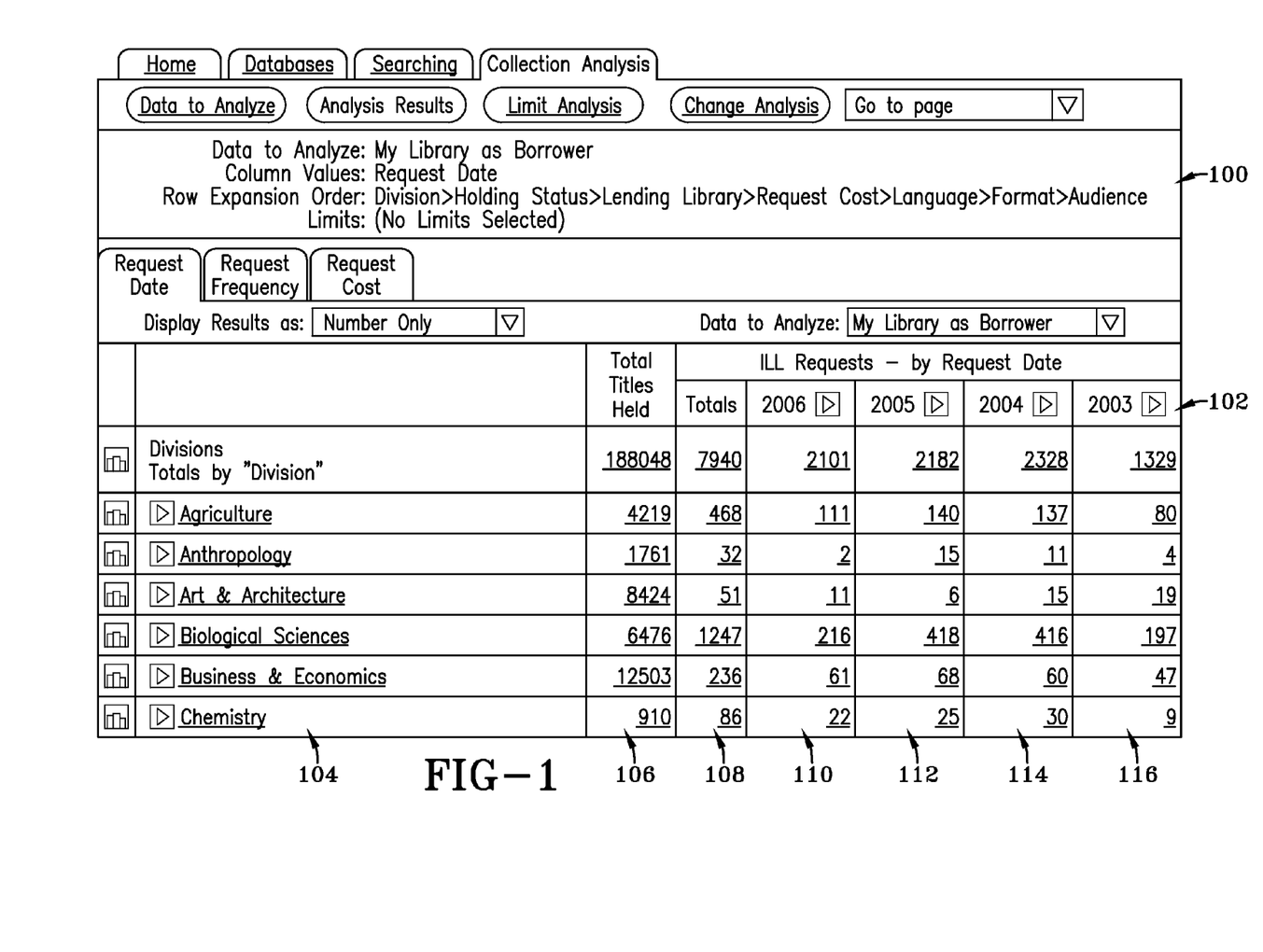
FIG. 1 is an example Request by Date analysis screen for a library as borrower.

Referring to FIG. 1, an example Request by Date analysis screen for a library as borrower is shown. The screen comprises a summary of the analysis request 100 and the results of the analysis 102 displayed in tabular form. Initially, the results are organized according to conspectus division 104 and show the total number of titles held by the library in the corresponding division 106 as well as the total number of borrowing requests for the corresponding division 108. The results also show the total number of borrowing requests annually for various years 110, 112, 114, 116.

Figure 2:
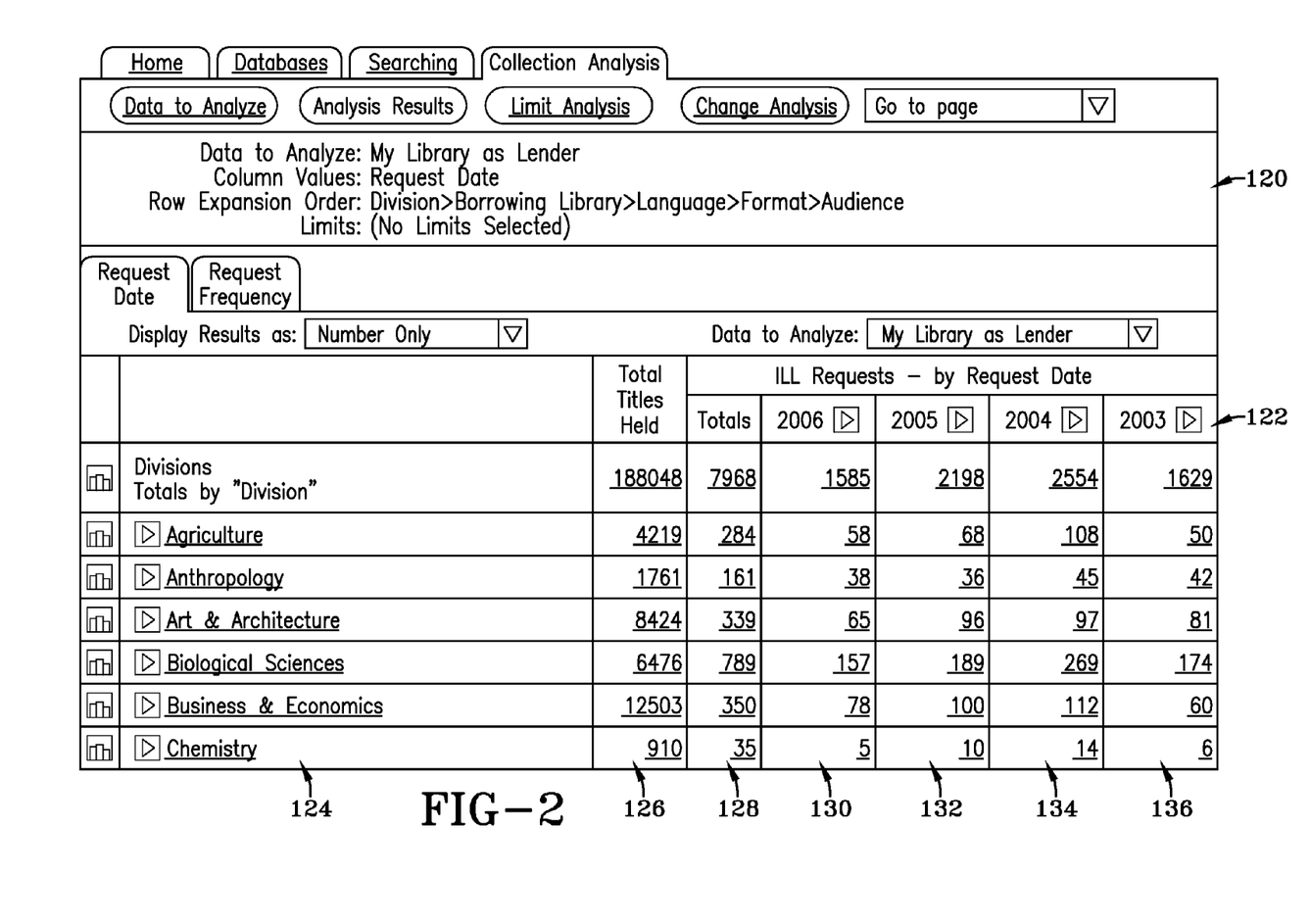
FIG. 2 is an example Request by Date analysis screen for a library as lender.

Referring to FIG. 2, an example Request by Date analysis screen for a library as lender is shown. The screen comprises a summary of the analysis request 120 and the results of the analysis 122 displayed in tabular form. Initially, the results are organized according to conspectus division 124 and show the total number of titles held by the library in the corresponding division 126 as well as the total number of lending requests for the corresponding division 128. The results also show the total number of lending requests annually for various years 130, 132, 134, 136.

Figure 3:
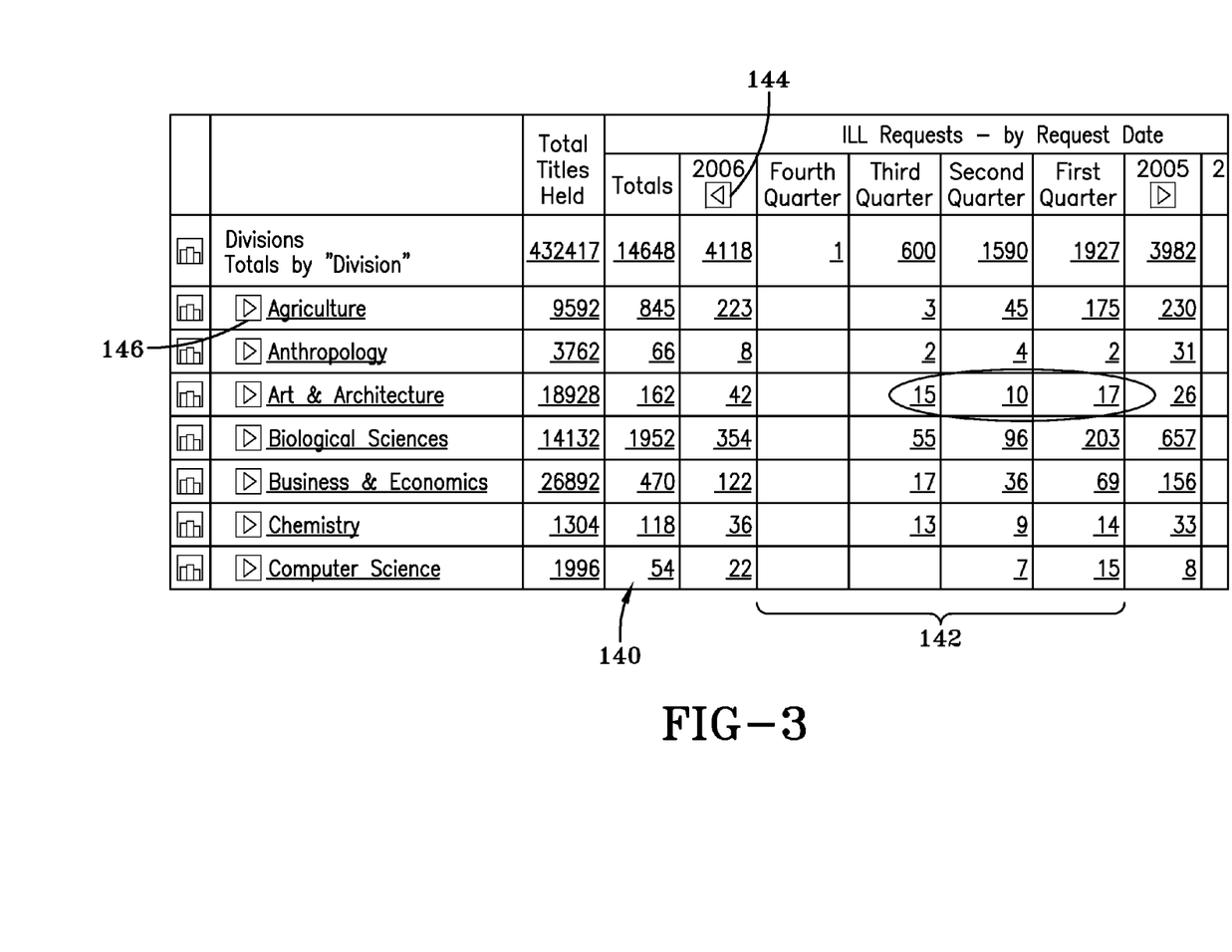
FIG. 3 shows results for an example expanded Request by Date analysis screen.

Referring to FIG. 3, results for an example expanded Request by Date analysis screen is shown. The totals 140 may be expanded into quarterly totals 142 by selecting an "expand column" icon 144 in the "year" column heading. In addition to expanding columns, rows can be expanded by selecting an "expand row" icon 146 next to the division. Rows expand as follows:

TABLE 2

Figure 4:
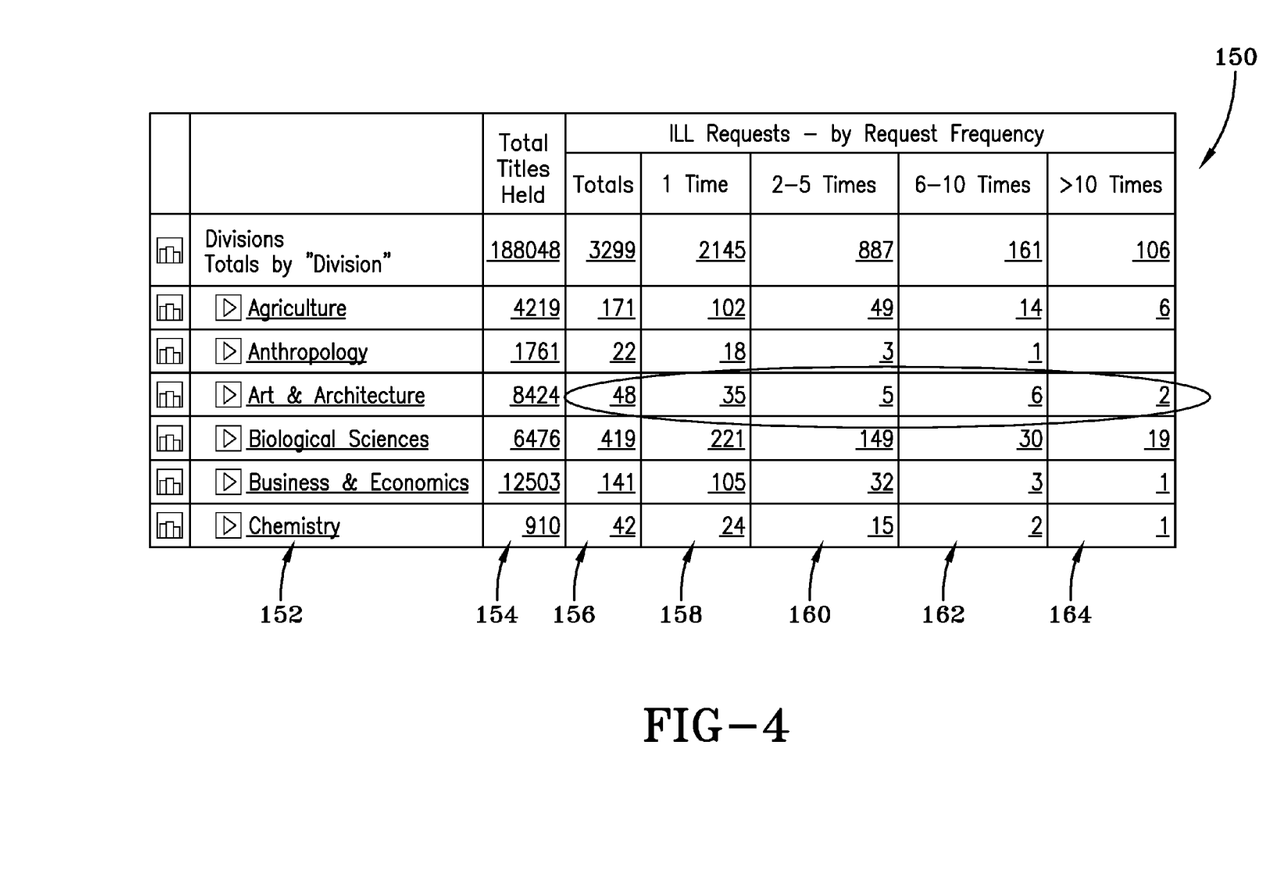
FIG. 4 shows results for an example Request by Frequency analysis screen.

Conspectus (Division/Category/Subject)
Holding Status
Lender
Language
Format
Audience Referring to FIG. 4, results for an example Request by Frequency analysis screen for a library is shown. An ILL analysis according to this dimension indicates how often borrowing requests were issued from a library as borrower for a specific item or how often the specific items were shipped from a library as lender. The screen comprises the results of the analysis 150 displayed in tabular form. Initially, the results are organized according to conspectus division 152 and show the total number of titles held by the library in the corresponding division 154 as well as the total number of lending requests for the corresponding division 156. The results also show totals according to the frequency of requests as follows: one time 158, 2-5 times 160, 6-10 times 162, and more than 10 times 164.

Rows may be expanded according to the following areas:

TABLE 3

Conspectus (Division/Category/Subject)
Holding Status
Language
Format
Audience

Referring to FIG. 5, results for an example Request by Cost analysis screen for a library is shown. An ILL analysis according to this dimension presents the costs incurred by a library to borrow items from other libraries. The screen comprises the results of the analysis 170 displayed in tabular form. Initially, the results are organized according to conspectus division 172 and show the total number of titles held by the library in the corresponding division 174 as well as the total number of borrowing requests for the corresponding division 176. The results further show the costs for the borrowing requests according to different ranges: nothing 178, $10 or less 180, between $10.01 and $20 182, between $20.01 and $30 182, between $30.01 and $40 182, between $40.01 and $50 182, more than $50 182, and unknown 184.

Rows may be expanded according to the following areas:

TABLE 4

Conspectus (Division/Category/Subject)
Holding Status
Language
Format
Audience

Figure 6:
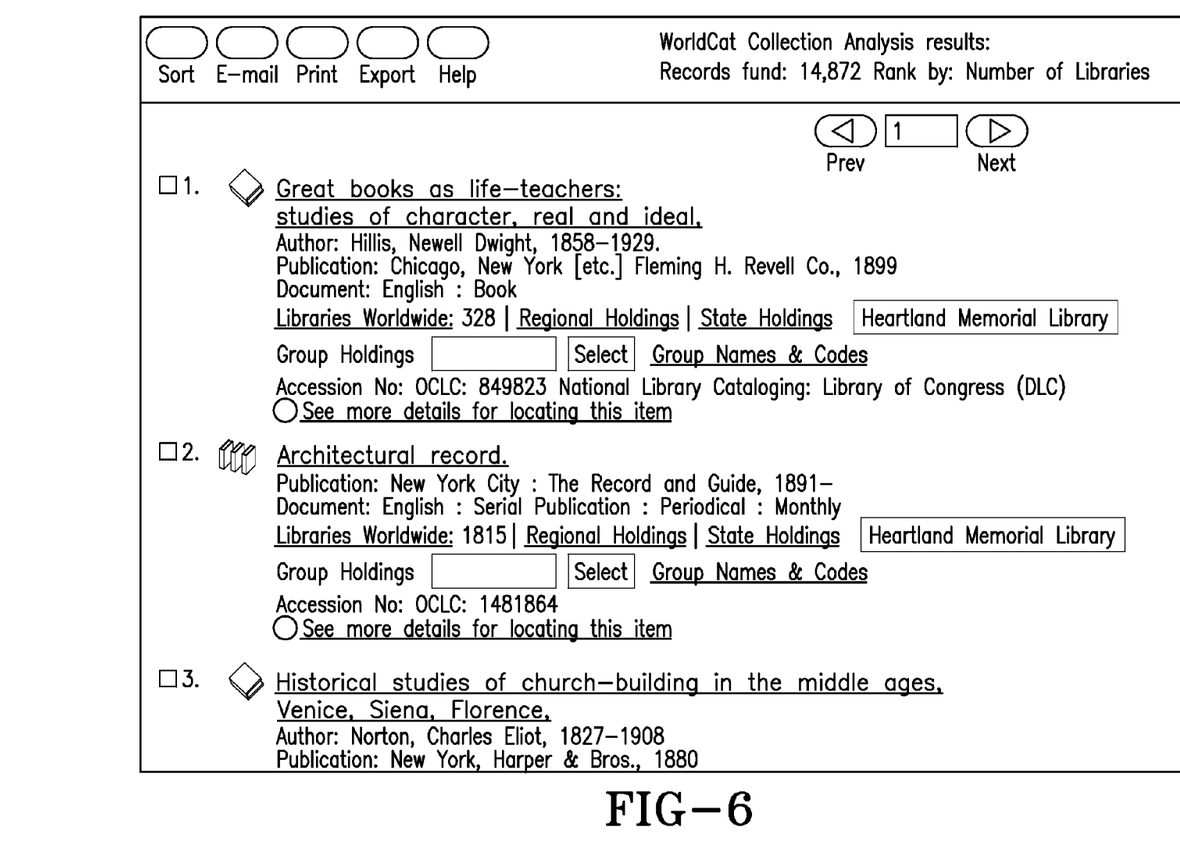
FIG. 6 is an example actual holdings screen.

Referring to FIG. 6, an example actual holdings screen for an example embodiment of the present invention is shown. To view a list of the titles for the actual holdings, the user selects the number shown in the corresponding table cell. The user may then scroll through the titles associated with the table cell.

The data provided in each analysis may be manipulated in various ways. A "limiting analysis" reduces the breadth of an analysis by specifying subsets of one or more analysis dimensions. Limiting analysis options may relate to the following:

TABLE 5

| | |
|---|---|
| Lending Library | One or more libraries included in analysis |
| Borrowing Library | One or more libraries included in analysis |
| Request Date | Various dates and ranges |
| Request Cost | For My Library as Borrower analysis only Various costs and ranges |
| Holding Status | For My Library as Borrower analysis only Shows how many borrowing requests were submitted for items not owned by the library |
| Copy/Loan | For My Library as Borrower analysis only Shows how many borrowing requests were submitted for physical items that the library expects to be returned to its collection (loan - such as books or videos) as opposed to items that it does not expect to be returned (copy - such as photocopies of journal articles) |
| Division | Limited by conspectus by division (not category or subject) |
| Publication Date | (As described below) |
| Language | (As described below) |
| Format | (As described below) |
| Audience | Adult and juvenile (based on MARC record Field 008, byte 22: target audience) |

Publication dates are grouped into these ranges:

TABLE 6

Pre-1500
1500-1599
1600-1699
1700-1799
1800-1849
1850-1899
1900-1924
1925-1949
1950-1959
1960-1969
1970-1979
1980-1989
1990-1994
1995-1999
2000
2001
2002
2003
2004
2005
2006
2007
Other Publication date ranges change as additional years are added. Major changes occur at the end of every decade. For example, in publication year 2009, ranges 1990-1994 and 1995-1999 will be merged 1990-1999, individual years 2000, 2001, 2002, 2003, and 2004 will be merged to 2000-2004.

Languages are from the "MARC Code List for Languages" (MARC record Field 008, bytes 35-37).

TABLE 7

Afrikans
Albanian
Arabic
Armenian
Bengali
Bosnian
Bulgarian
Catalan
Chinese
Croatian
Czech
Danish
Dutch
English
Finnish
French
German
Greek
Modern
(1453-)
Gujarati
Hebrew
Hindi
Hungarian
Indonesian
Italian
Japanese
Korean
Latin
Macedonian
Malay
Marathi
Norwegian
Panjabi
Persian
Polish
Portuguese
Romanian
Russian
Sanskrit
Serbian

TABLE 7-continued

Slovak
Slovenian
Spanish
Swedish
Tagalog
Tamil
Telugu
Thai
Tibetan
Turkish
Ukrainian
Urdu
Vietnamese
Yiddish
Other Format data relates to the following materials types [MARC record Leader (LDR), bytes 6 (Type of Record) and 7 (Bibliographic level)]:

TABLE 8

Archival Materials
Archival Materials, Electronic
Archival Materials, Microform
Articles
Articles, Electronic
Articles, Microform
Books
Books, Microform
Computer Files
Continually Updated Resources
Continually Updated Resources, Electronic
Continually Updated Resources, Microform
Maps
Maps, Electronic
Maps, Microform
Musical Scores
Musical Scores, Electronic
Musical Scores, Microform
Serial Publications
Serial Publications, Electronic
Serial Publications, Microform
Sound Recordings
Sound Recordings, Electronic
Sound Recordings, Microform
Texts, Electronic
Visual Materials
Visual Materials, Electronic
Visual Materials, Microform Once limits are set, they are applied to subsequent tables as well as corresponding graph views, printing, and exporting.

Figure 8:
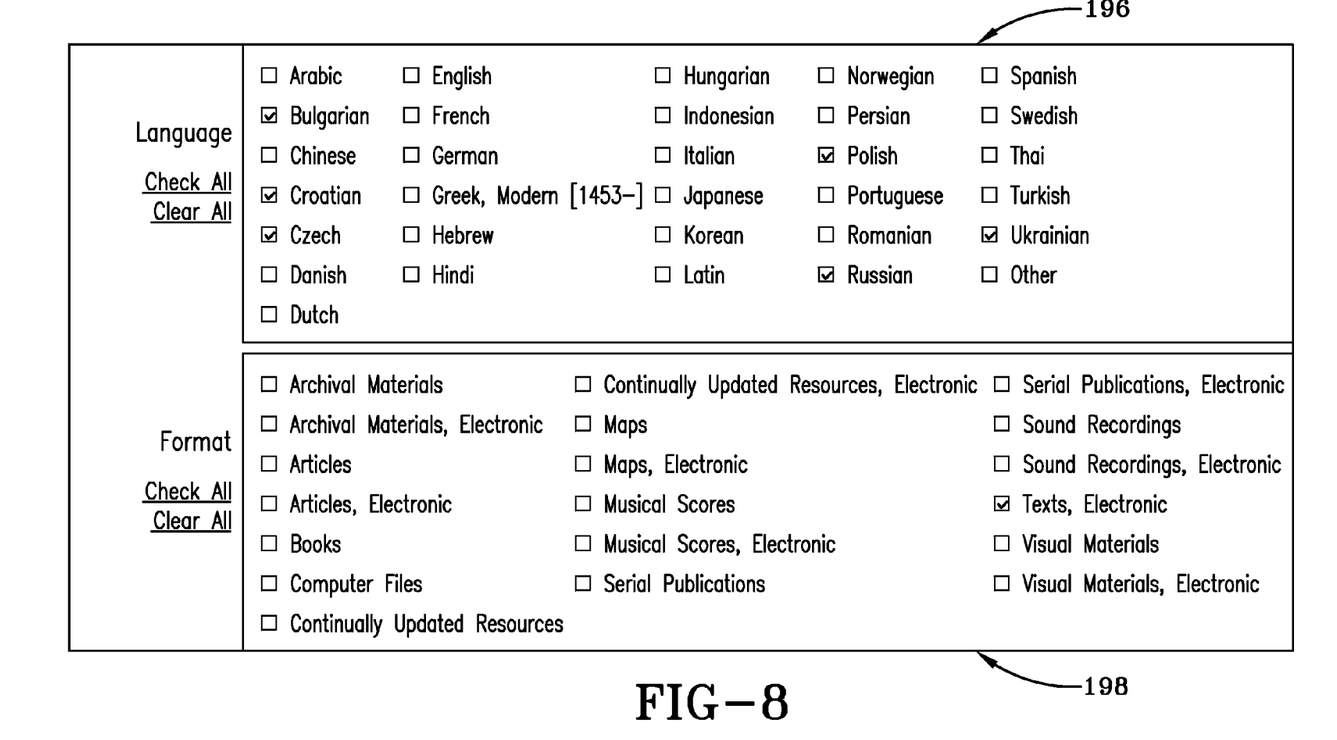

The number of libraries with which a particular library participates in ILL transactions can be very large. To reduce scrolling and still provide a complete list of lenders when necessary, the lending library dimension can be limited by means of radio buttons that appear below a dimension title. Referring to FIGS. 7 and 8, sample screens for limiting dimensions of an analysis are shown. FIG. 7 provides options for limiting according to borrowing library 190, request date 192, and copy/loan 194. Options related to borrowing library 190 may include the following.

TABLE 9

| Button | Displays |
|---|---|
| Top 10 | Ten libraries to which greatest number of requests have been submitted. |
| Top 25 | Twenty-five libraries to which greatest number of requests have been submitted. |
| Top 50 | Fifty libraries to which greatest number of requests have been submitted. |
| All | All libraries to which requests have been submitted. |

Figure 9:
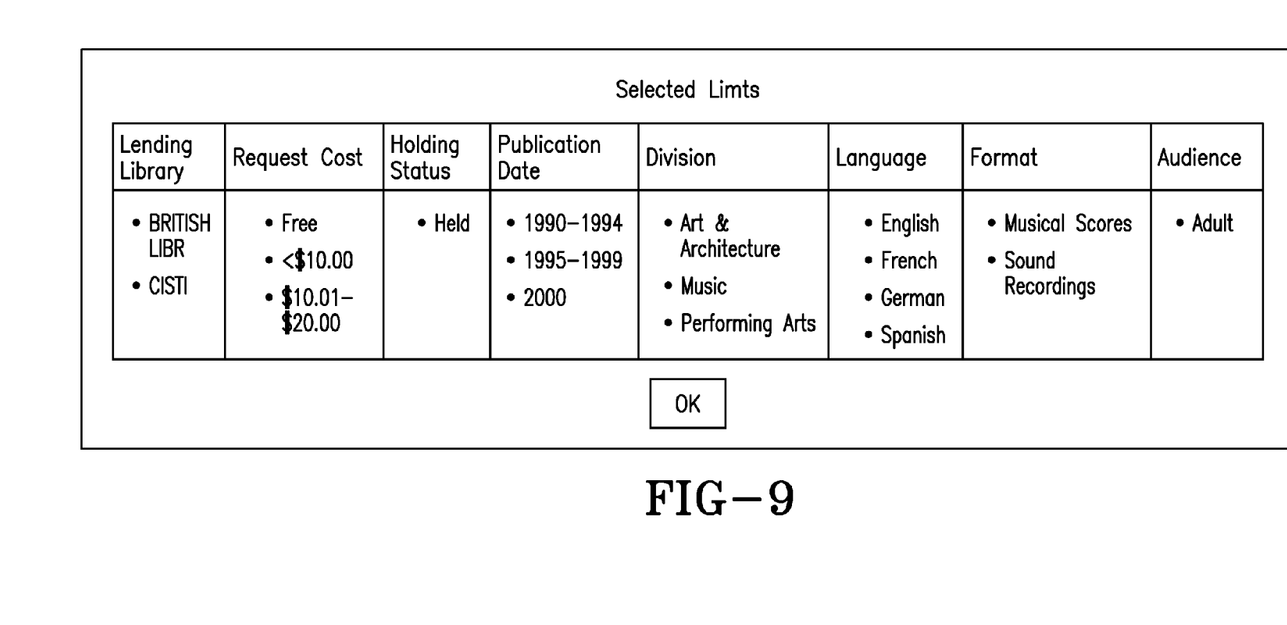
FIG. 9 is an example selected limits screen.

The "top" options result in a list of libraries by name and the number of requests associated with the library. As a result, it is possible to see which library made the largest number of requests followed by the second largest number of requests, etc. In FIG. 7, the combined limiting factors of top three libraries 190, request date of 2005 192, and copy 194 limits the analysis to the top three libraries to which the library shipped the most copies in 2005. FIG. 8 illustrates additional limiting options for language 196 and format 198. FIG. 9 is a sample screen for viewing selected limits (e.g., lending library, request costs, holding status, publication date, division, language, format, and audience).

Figure 10:
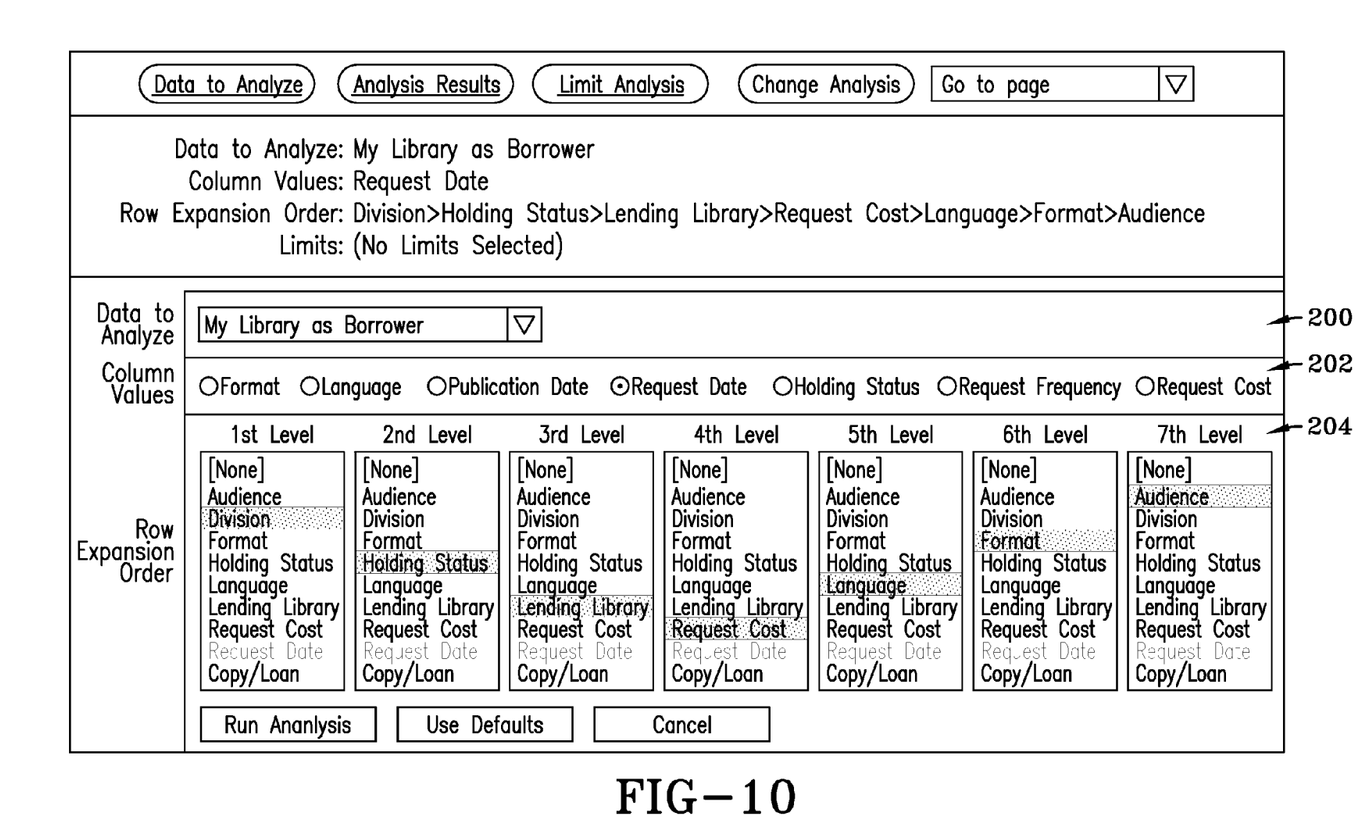
FIG. 10 is an example change analysis screen.

Results data may also be manipulated by changing the order in which dimensions are applied to an existing analysis. Referring to FIG. 10, an example change order analysis screen is shown. First, the data to analyze is specified 200. The following column values may be selected to change the order in the results data 202: "format," "language," "publication date," "request date," "holding status," "request frequency," and "request cost." Selections for row expansion order are also supported. For row expansion, the following dimensions may be re-ordered except for the one selected in the column value 204: "audience," "division," "format," "holding status," "language," "borrowing/lending library," "request cost" (library as borrower), "request date," and "copy/loan."

The present invention is a tool for preparing detailed analyses of ILL transactions using an existing collection analysis structure. The ILL transaction analyses assist a library in understanding what materials and items its patrons are most often requesting from other libraries. The library may better serve its patrons by adding to its collection the materials and items that are of greatest interest to its patrons. The analyses may also assist a library in understanding what materials and items are of interest to patrons from other libraries. The information may help a library better understand its own areas of expertise and identify other acquisitions that allow it to expand its offerings in its various areas of expertise.

While certain exemplary embodiments are described in detail above, the scope of the application is not to be considered limited by such disclosure, and modifications are possible without departing from the spirit of the invention as evidenced by the following claims:

The invention claimed is:
1. A computerized method for automated analysis of a library's collection comprising:
(a) recording in a computer accessible database inter-library loan transaction data for said library, said inter-library loan transaction data comprising data identifying specific items from said library's collection requested by patrons;
(b) receiving at a server from a user computer a selection of a role for said library as a borrower or a lender;
(c) receiving at said server from said user computer a selection of an inter-library loan request activity for accessing a plurality of inter-library loan requests, said inter-library loan request activity identifying:
(1) a sorting parameter for sorting said plurality of inter-library loan requests; and
(2) an inter-library loan activity time period;
(d) retrieving from said computer accessible database inter-library loan transaction data for a plurality inter-library loan requests according to:
(1) said role; and
(2) said inter-library loan request activity for said library;
(e) automatically identifying at said computer for each specific item in a request a corresponding subject matter division within a conspectus;
(f) calculating at said computer for each subject matter division within said conspectus a total number of requests for specific items within said subject matter division;
(g) generating for display at said user computer a screen display comprising an analysis of said inter-library loan transaction data for said plurality of inter-library loan requests for said inter-library loan activity period sorted according to:
(1) said sorting parameter for said plurality of inter-library loan requests;
(2) said subject matter divisions within said conspectus; and
(3) for each subject matter division in said conspectus said total number of requests for specific items in said subject matter division.

2. The computerized method of claim 1 wherein said sorting parameter for said inter-library loan request activity is selected from the group consisting of request by date, request by frequency, and request by cost.

3. The computerized method of claim 2 wherein said inter-library loan transaction data sorted according to said sorting parameter of request by date comprises total requests for each of a plurality of years for each subject matter division in said conspectus.

4. The computerized method of claim 3 further comprising totaling requests for each of a plurality of quarters for a year for each subject matter division in said conspectus.

5. The computerized method of claim 2 wherein said inter-library loan transaction data sorted according to said sorting parameter of request by frequency comprises total requests for each of a plurality of frequencies for each subject matter division in said conspectus.

6. The computerized method of claim 5 wherein said plurality of frequencies are selected from the group consisting of one time, 2-5 times, 6-10 times, and more than 10 times.

7. The computerized method of claim 2 wherein said inter-library loan transaction data sorted according to said sorting parameter of request by costs comprises total requests for each of a plurality of cost ranges for each subject matter division in said conspectus.

8. The computerized method of claim 7 wherein said plurality of cost ranges are selected from the group consisting of nothing and greater than a specified dollar amount.

9. The computerized method of claim 1 further comprising revising said display of said inter-library loan data by expanding said subject matter divisions to show sub-divisions and for each sub-division to show a total number of requests according to said role for said library and said loan request activity for said library.

10. A computerized system for automated analysis of a library's collection comprising:

a computer accessible database comprising inter-library loan transaction data for said library, said inter-library loan transaction data comprising data identifying specific items from said library's collection requested by patrons; and a computer equipped with a web browser for accessing a web-based software application that provides access to and analysis of said inter-library loan transaction data in said database by:
(a) prompting a user to specify a borrower role or lender role for said library;
(b) prompting said user to specify an inter-library loan request activity for accessing a plurality of inter-library loan requests, said inter-library loan request activity identifying:
(1) a sorting parameter for sorting said plurality of inter-library loan requests; and
(2) an inter-library loan activity period;
(c) retrieving from said computer accessible database inter-library loan transaction data for a plurality of inter-library loan requests according to:
(1) said role; and
(2) said inter-library loan request activity for said library;
(d) automatically identifying at said computer for each specific item in a request a corresponding subject matter division within a conspectus;
(e) calculating at said computer for each subject matter division within said conspectus a total number of requests for specific items within said subject matter division;
(f) generating for display to said user a screen display comprising an analysis of said inter-library loan transaction data for said plurality of inter-library loan requests for said inter-library loan activity period sorted according to:
(1) said sorting parameter for said plurality of inter-library loan requests;
(2) subject matter divisions within said conspectus; and
(3) for each subject matter division in said conspectus said total number of requests for specific items in said subject matter division.

11. The computerized system of claim 10 wherein said sorting parameter for said inter-library loan request activity is selected from the group consisting of request by date, request by frequency, and request by cost.

12. The computerized system of claim 10 wherein said inter-library loan transaction data sorted according to said sorting parameter of request by date comprises total requests for each of a plurality of years for each subject matter division in said conspectus.

13. The computerized system of claim 12 further comprising total requests for each of a plurality of quarters for a year for each subject matter division in said conspectus.

14. The computerized system of claim 11 wherein said inter-library loan transaction data sorted according to said sorting parameter of request by frequency comprises total requests for each of a plurality of frequencies for each subject matter division in said conspectus.

15. The computerized system of claim 14 wherein said plurality of frequencies are selected from the group consisting of one time, 2-5 times, 6-10 times, and more than 10 times.

16. The computerized system of claim 11 wherein said inter-library loan transaction data sorted according to said sorting parameter of request by costs comprises total requests for each of a plurality of cost ranges for each subject matter division in said conspectus.

17. The computerized system of claim 16 wherein said plurality of cost ranges are selected from the group consisting of nothing and greater than a specified dollar amount.

18. The computerized system of claim 10 further comprising revisions to said presentation of said inter-library loan data wherein said subject matter divisions are expanded to show sub-divisions and for each sub-division to show a total number of requests according to said role for said library and said loan request activity for said library.

* * * * *